(12) United States Patent
Kretzschmann et al.

(10) Patent No.: US 8,721,235 B2
(45) Date of Patent: May 13, 2014

(54) DRILLING TOOL WITH DRILL BIT

(75) Inventors: Uwe Kretzschmann, Wangelau (DE);
Rico Schneider, Pleidelsheim (DE);
Henry Schuett, Sachsenheim (DE);
Matthias Luik, Reutlingen (DE);
Matthias Oettle, Riederich (DE)

(73) Assignees: Komet Group GmbH, Besigheim (DE);
Hartmetall-Werkzeugfabrik Paul Horn GmbH, Teubingen (DE)

( * ) Notice: Subject to any disclaimer, the term of this patent is extended or adjusted under 35 U.S.C. 154(b) by 996 days.

(21) Appl. No.: 12/733,669

(22) PCT Filed: Jul. 16, 2008

(86) PCT No.: PCT/EP2008/059286
§ 371 (c)(1),
(2), (4) Date: Jun. 21, 2010

(87) PCT Pub. No.: WO2009/037020
PCT Pub. Date: Mar. 26, 2009

(65) Prior Publication Data
US 2010/0266357 A1  Oct. 21, 2010

(30) Foreign Application Priority Data
Sep. 14, 2007 (DE) .......................... 10 2007 044 095

(51) Int. Cl.
*B23B 51/02* (2006.01)

(52) U.S. Cl.
USPC ........... 408/231; 408/232; 408/713; 408/226; 408/144; 408/57

(58) Field of Classification Search
USPC ............. 408/57, 56, 231–233, 226, 713, 230, 408/227, 199, 200
See application file for complete search history.

(56) References Cited

U.S. PATENT DOCUMENTS 1,017,352 A * 2/1912 Wagner .......................... 408/224
4,443,136 A 4/1984 Kemmer
(Continued)

FOREIGN PATENT DOCUMENTS

DE  10 2005 047 371 A1  5/2006
EP  0 813 459  12/1997
(Continued)

OTHER PUBLICATIONS

German Patent Office Search Report dated Aug. 13, 2008 (4 pages).
(Continued)

*Primary Examiner* — Eric A Gates
*Assistant Examiner* — Paul M Janeski
(74) *Attorney, Agent, or Firm* — Flynn, Thiel, Boutell & Tanis, P.C.

(57) ABSTRACT

The invention relates to a drilling tool with a base, having a central axis of rotation, and a drill bit, detachably connected to the base. The drill bit has a coupling part, which can be coupled with a coupling receptacle on the face of the base and has at least two convexly curved centring portions, which are arranged such that they are distributed over the circumference and engage with an exact fit in complementary concavely curved centring portions of the coupling receptacle. The coupling part has a complementary driver stop, meshing with a rotary driver of the coupling receptacle. It is claimed as novel that the centring portions of the coupling part and/or of the coupling receptacle have clamping surfaces, which run onto each other in the manner of a rotary wedge until the driver stop and the rotary driver come up against each other counter to a predetermined direction of rotation.

26 Claims, 5 Drawing Sheets

(56) References Cited

U.S. PATENT DOCUMENTS

Figures 1A, 1B:
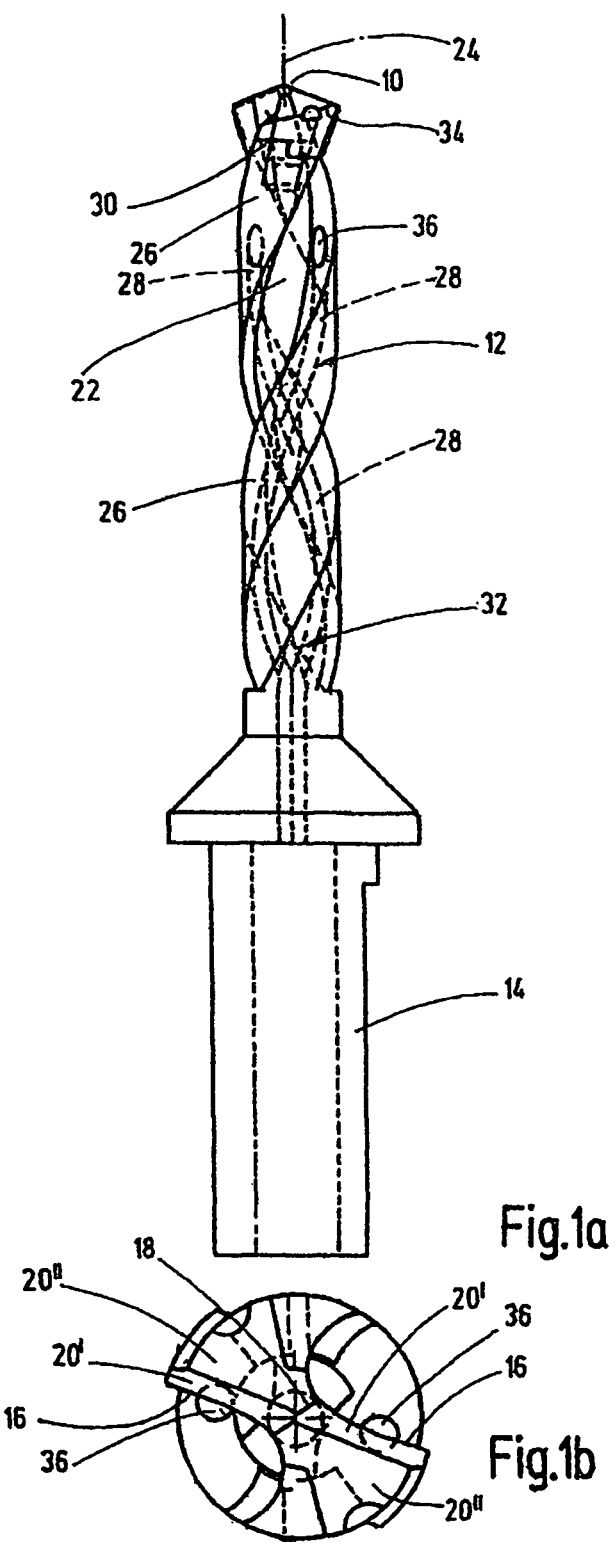
Figure 7A:
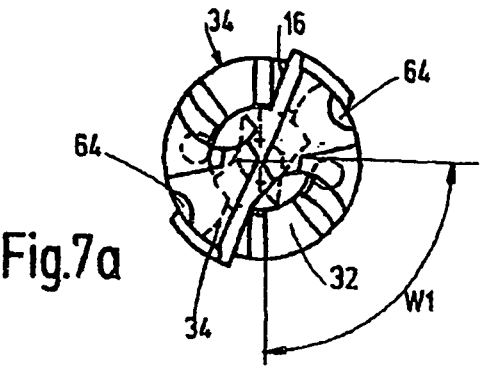
Figure 7B:
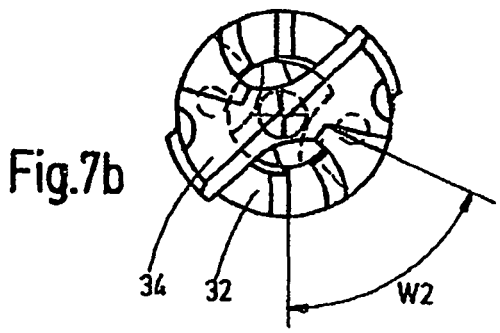
Figure 7C:
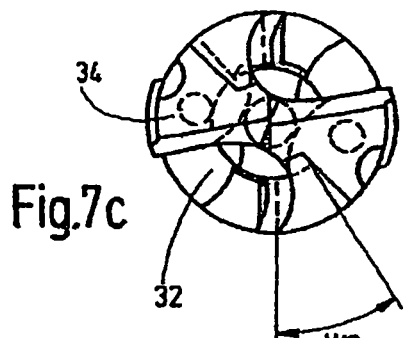

| | | | |
|---|---|---|---|
| 5,442,979 A * | 8/1995 | Hsu | 76/108.6 |
| 5,599,145 A * | 2/1997 | Reinauer et al. | 408/233 |
| 5,909,985 A * | 6/1999 | Shiga et al. | 408/1 R |
| 5,957,631 A | 9/1999 | Hecht | |
| 5,988,953 A * | 11/1999 | Berglund et al. | 408/1 R |
| 6,012,881 A | 1/2000 | Scheer | |
| 6,045,301 A * | 4/2000 | Kammermeier et al. | 408/57 |
| 6,059,492 A * | 5/2000 | Hecht | 408/144 |
| 6,109,841 A * | 8/2000 | Johne | 408/144 |
| 6,116,825 A * | 9/2000 | Kammermeier et al. | 408/1 R |
| 6,485,235 B1 * | 11/2002 | Mast et al. | 408/1 R |
| 6,506,003 B1 | 1/2003 | Erickson | 408/226 |
| 7,048,480 B2 * | 5/2006 | Borschert et al. | 408/144 |
| 7,070,367 B2 * | 7/2006 | Krenzer | 408/226 |
| 7,309,196 B2 | 12/2007 | Ruy Frota de Souza | |
| 7,377,730 B2 * | 5/2008 | Hecht et al. | 408/231 |
| 7,393,162 B2 * | 7/2008 | Hecht | 408/1 R |
| 7,407,350 B2 * | 8/2008 | Hecht et al. | 408/231 |
| 2002/0168239 A1 | 11/2002 | Mast et al. | |
| 2005/0084352 A1 * | 4/2005 | Borschert et al. | 408/226 |
| 2005/0260046 A1 * | 11/2005 | Hecht et al. | 408/31 |
| 2006/0051172 A1 * | 3/2006 | Johnson et al. | 408/224 |
| 2006/0072976 A1 | 4/2006 | Frota de Souza | |
| 2006/0204345 A1 * | 9/2006 | Borschert et al. | 408/59 |

FOREIGN PATENT DOCUMENTS

| | | |
|---|---|---|
| EP | 1 306 153 A1 | 5/2003 |
| WO | WO 96/27469 | 9/1996 |
| WO | WO 98/10881 | 3/1998 |
| WO | WO 03/070408 A1 | 8/2003 |
| WO | WO 2006/046227 A1 | 5/2006 |
| WO | WO 2008/014367 A1 | 1/2008 |

OTHER PUBLICATIONS

International Search Report dated Nov. 7, 2008 (5 pages).

* cited by examiner

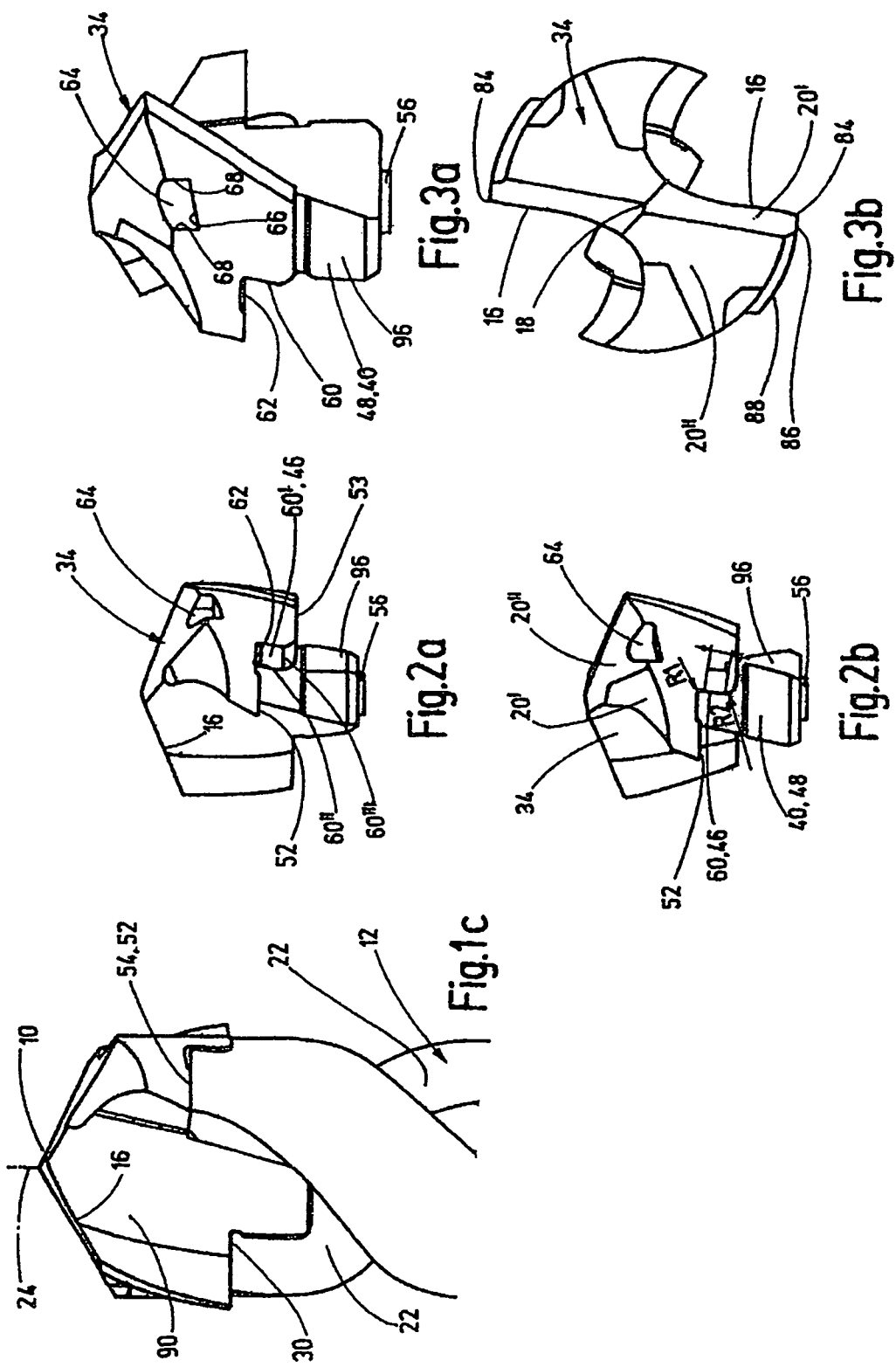

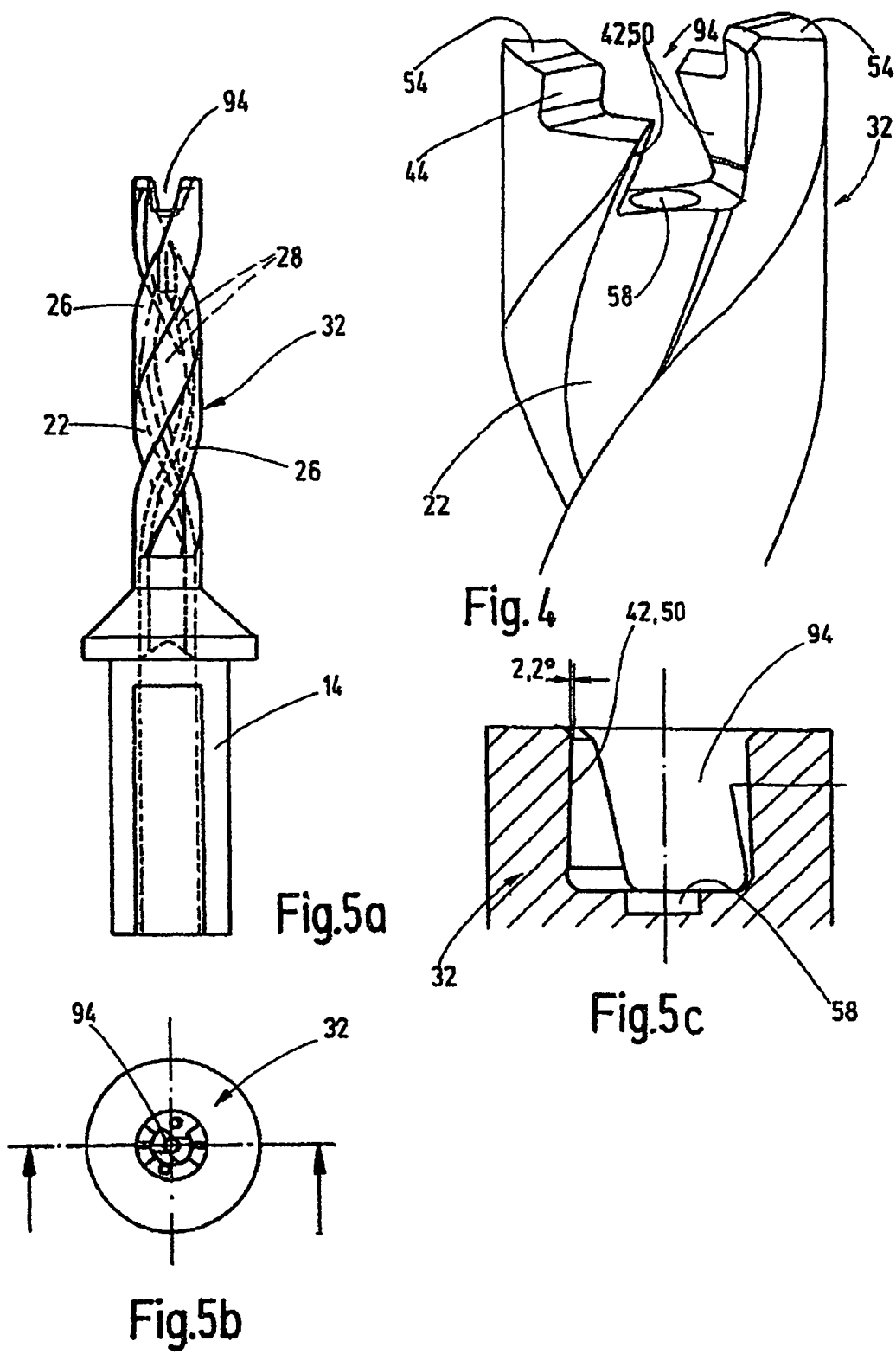

DRILLING TOOL WITH DRILL BIT

The invention relates to a drilling tool with a basic body having a central axis of rotation and with a drill bit connected releasably to the basic body, the drill bit having a coupling part which is couplable to an end-face coupling receptacle of the basic body and which has at least two convexly curved centering portions which are arranged so as to be distributed over the circumference and which engage with an exact fit into concavely curved centering portions, complementary to said convexly curved centering portions, of the coupling receptacle, and the coupling part having at least one complementary driver stop meshing with a rotary driver of the coupling receptacle.

A drilling tool of this type is known (EP 0 813 459 B1), in which coupling between the basic body and the coupling part takes place with the aid of a tension screw which passes through a threaded bore in the basic body and engages with its tapered tip into an eccentric conical countersink of the drill bit. The conical countersink in the basic body and the tapered tip of the tension screw ensure that planar face bracing occurs between the basic body and the drill bit. The use of additional tension means makes it more difficult to handle the known drilling tool when the drill bit is being changed. The production of the individual components is also relatively complicated and leads to material weakening in the region of the separation point.

Proceeding from this, the object on which the invention is based is to develop a drilling tool of the type initially specified, of which the handling when the drill bit is being changed is relatively simple and which, in spite of a small overall size of its components, has high dimensional stability and repeatability accuracy.

To achieve this object, the feature combination specified in patent claim 1 is proposed. Advantageous refinements and developments of the invention may be gathered from the dependent claims.

The solution according to the invention arises from the idea that an especially simple exchangeability of the drill bit with high changing accuracy can be achieved in that, between the drill bit and the basic body, a stable positive and non-positive connection is achieved, which makes it unnecessary to use additional tension means. In order to attain this, it is proposed, according to the invention, that the centering portions of the coupling part and/or of the coupling receptacle have, up to the abutment of the rotary stop against the rotary driver, tension faces running toward one another in the manner of a rotary wedge opposite to a predetermined working direction of rotation. The desired non-positive connection is achieved in that in each case at least one of the centering portions facing one another is elastically deformable or bendable.

In an advantageous refinement of the invention, the tension face of the coupling part and/or of the coupling receptacle form/forms in outline Archimedean screws lying diametrically opposite one another and having a radius decreasing opposite to the predetermined working direction of rotation with respect to the axis of rotation.

In a further preferred refinement of the invention, the tension faces of the coupling part and/or of the coupling receptacle form in outline circle segments which lie diametrically opposite one another and are eccentric with respect to the axis of rotation. In order to make mounting easier and nevertheless to acquire the desired non-positive connection, it is proposed, according to a preferred refinement of the invention, that the concave tension faces of the round-body-side coupling receptacle form in outline section part circles concentric with respect to the axis of rotation and having a predetermined radius, and that the convex tension faces of the drill-bit-side coupling part have a part-circular guide portion concentric with respect to the axis of rotation, with a radius corresponding to the receptacle-side radius, and a part-circular tension portion tangentially adjoining said guide portion and eccentric with respect to the axis of rotation, with a radius larger than the receptacle-side radius, the part-circular eccentric tension portions of the coupling part and the part-circular concentric tension faces of the coupling receptacle bearing non-positively one against the other in their tension position. The radius of the eccentric part-circular tension portion of the coupling part is in this case larger by the amount of its eccentricity than the radius of the concentric guide portion. Especially simple mounting is achieved in that the coupling part and the coupling receptacle are rotatable with respect to one another in the manner of a bayonet fastening at the separation point.

According to a preferred refinement of the invention, an additional positive connection is achieved during the mounting of the drill bit in that the tension faces form conical faces which face one another in pairs and complete one another to form a cone with a cone axis concentric with respect to the predetermined axis of rotation. Expediently, for this purpose, the coupling part and the coupling receptacle have planar faces or planar face portions which face one another and, in the coupling position, are pressed one against the other under the action of the conical tension faces and are oriented essentially perpendicularly with respect to the axis of rotation. This not only results in the positive connection, but also in a frictional connection in the region of the planar face portions. Advantageously, the cone angle of the conical faces completing one another is 1° to 8°, while the coupling-part-side cone angle may be slightly steeper than the coupling-receptacle-side cone angle, in order, in the tensioned state, to obtain, while taking into account the deformation, a large-area non-positive connection in the region of the conical faces.

In a further preferred refinement of the invention, the rotary driver of the coupling receptacle and the driver stop, complementary to this, on the coupling part have an abutment slope which in the coupling state forms a positive connection between the basic body and the drill bit. The angle of incidence of the abutment slope is in this case expediently 8° to 15°. According to a preferred refinement of the invention, the abutment slope of the driver stop of the drill bit forms a planar or crowned face part delimited by two marginal parts which lie opposite one another and of which one is concavely curved and the other convexly curved, and which, forming an acute angle, merge directly or indirectly via a relief, in each case by means of a planar face portion perpendicular with respect to the axis of rotation of the drill bit. Since the planar face portions are oriented parallel to one another, the acute angles of the marginal parts are substantially identical and correspond to a right angle reduced by the angle of incidence of the abutment slope.

In a further preferred refinement of the invention, the coupling part and the coupling receptacle have a preferably cylindrical, conical or crowned central tenon and a central recess, complementary to this, as a precentering means.

At least one cutting edge active in the predetermined direction of rotation about the axis of rotation is arranged on the drill bit. Advantageously, two or three end-face cutting edges arranged so as to be offset with respect to one another by 180° or 120° are provided. Further, the drill bit and the basic body advantageously have two or three chip-conveying grooves which merge one into the other over the separation point and which are advantageously at least partially coiled along the basic body. The chip-conveying grooves are in this case expediently delimited in their flanks by ribs, there being arranged in each of the ribs of the basic body a coolant duct which at the drill-bit-side end of the basic body has an outlet orifice arranged within one of the chip-conveying grooves. The outlet orifice may in this case form or issue into a marginally open channel running along the chip-conveying grooves, the channels in each case merging into a channel arranged in the drill bit and leading to a cutting edge.

Advantageously, the drill bit consists of a harder material than the basic body. For example, the drill bit is formed as a pressing or casting from hard metal or ceramic material. On the other hand, the basic body may be hardened at least in the region of its functional faces designed as bearing or tension faces for the drill bit.

So that the drill bit can be connected to or released from the basic body by means of simple manipulations, according to a preferred refinement of the invention it is proposed that at least two marginally open key engagement points which are at an angular distance from one another in the circumferential direction and are expediently at an angular distance of about 180° from one another be arranged in the flank or minor flank region of the drill bit. The key engagement points preferably have an axial and a radial marginal orifice. In order to distribute the key forces equally to the various key engagement points, it is advantageous if the key engagement points have key abutment faces which are oriented essentially parallel to the axis of rotation and are delimited by an engagement bottom and which are of approximately equal height in the closing and the opening direction. In order to achieve this, it is advantageous if the engagement bottoms of the key engagement points run obliquely with respect to a circumferential plane perpendicular to the axis of rotation, the engagement bottoms being oriented, at least in the circumferential direction, approximately parallel to the associated flank or minor flank.

Figure 6B:
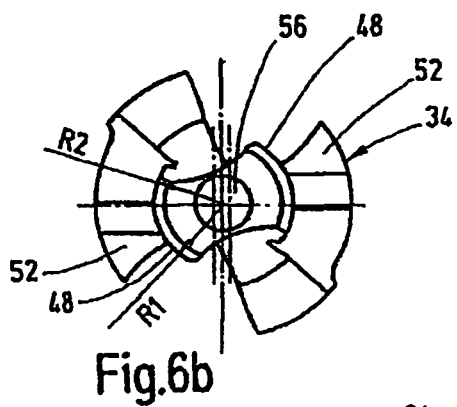
Figure 6A:
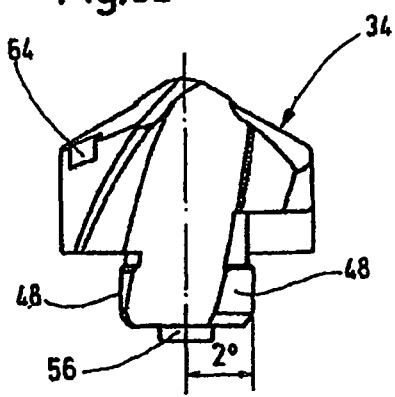
Figure 7D:
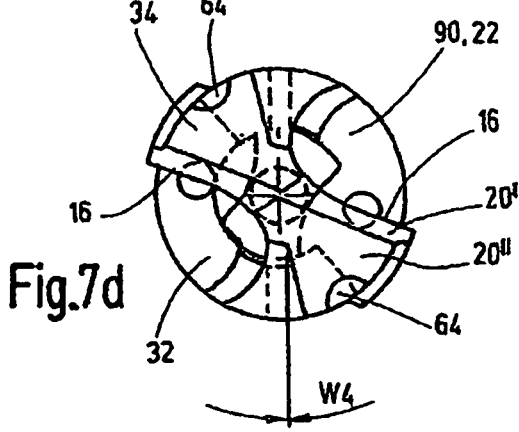
Figure 8:
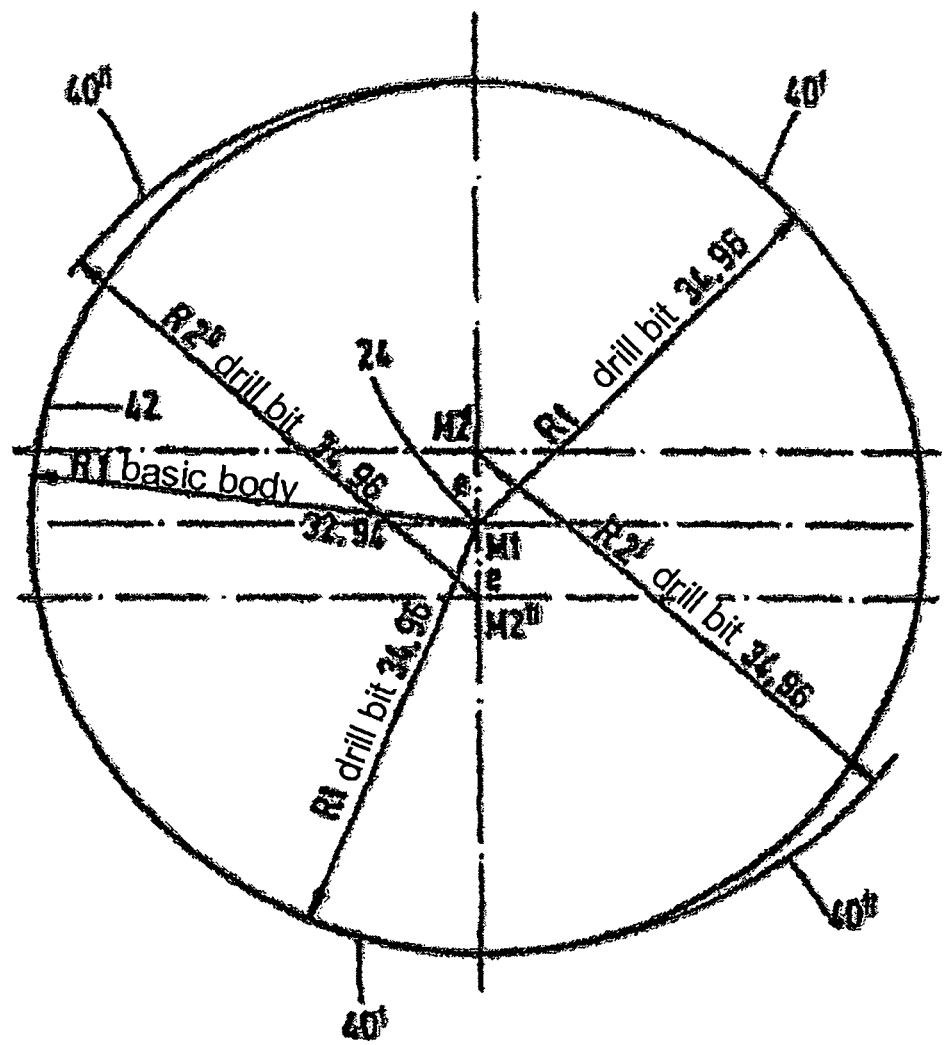

The invention is explained in more detail below with reference to the drawing in which:

FIGS. 1a and b show a side view and a top view of a drilling tool with drill bit;

FIG. 1c shows an enlarged detail of the drilling tool according to FIG. 1a;

FIGS. 2a and b show two side views of the drill bit of the drilling tool in various rotary positions;

FIGS. 3a and b show a further side view and a top view of the drill bit in order to illustrate the key receptacles;

FIG. 4 shows a diagrammatic illustration of the coupling receptacle on the basic body;

FIGS. 5a and b show a side view and a top view of the basic body;

FIG. 5c shows a section along the sectional line C-C of FIG. 5b in an enlarged illustration;

FIGS. 6a and b show a side view and a bottom view of a drill bit with dimensional values given;

FIGS. 7a to d show top views of the drilling tool with various rotary positions of the drill bit with respect to the basic body in order to illustrate the screwing of the drill bit into the basic body;

FIG. 8 shows a diagram of the tension faces, engaging one in the other and part-circular in outline, of the coupling part and of the coupling receptacle in order to explain the arrangement and action of the eccentric tension portions of the coupling part.

The drilling tools illustrated in the drawing are divided in two at a separation point 30 and consist of a basic body 32 carrying a drill shank 14 and of a drill bit 34 having a drill tip 10. The drill bit 34 and the basic body 32 are connectable to one another positively and non-positively at the separation point 30. Whereas the basic body 32 preferably consists of tool steel or of a high-speed machining steel, the drill bit 34 is formed as a molding from a cutting material from the hard metal or ceramic group, which is produced and sintered as a sintered powder-sprayed casting or pressing. It is basically also possible to produce the drill bit 34 from a tool steel having a wear-resistant coating.

The drilling tool illustrated in FIGS. 1a to c has a drill tip 10, a chip discharge part 12 adjoining the drill bit, and a drill shank 14 integrally formed rearwardly on the chip discharge part 12. The drill tip 10 contains two major cutting edges 16 and a chisel edge 18 connecting the major cutting edges 16 to one another on the tip side, and also major flanks 20' and minor flanks 20" adjoining the major cutting edges 16 and the chisel edge 18. Two helical chip-conveying grooves 22 extend from the major cutting edges 16 over the chip discharge part 12 and reach, on the side of the basic body, as far as the drill shank 14. The separation point 30 is located between the chip-conveying grooves 22 in the region of the chip discharge part 12. The chip-conveying grooves 22 are delimited on their flanks by ribs 26 in each of which a coolant duct 28 is arranged. The coolant ducts 28 are coiled with the same pitch as the ribs 26 and merge toward the drill-bit side into a rectilinear duct portion 28'. The duct portions 28' are intercepted there by the coiled chip-conveying grooves 22 so as to form an oval outlet orifice 36 pointing into the chip-conveying groove. The outlet orifices are positioned so that they are directed onto the associated major cutting edges 16 of the drill bit 34. The outlet orifices 36 may issue into a marginally open channel, not illustrated, running along the associated chip-conveying groove 22. Said channel may merge in each case into a channel, not illustrated, which is arranged in the drill bit 34 and leads to one of the major cutting edges 16.

The cutting edge corners 84 projecting radially beyond the outer circumference of the drill bit 34 merge into a guide edge 86 to which is contiguous in the circumferential direction a guide rib 88 extending over a part circumference of the drill bit and projecting radially beyond the outer circumference.

The chip-conveying grooves 22 commencing directly behind the major cutting edges 16 in the chip run-off direction are delimited on the side of the cutting edges in each case by a rake 90.

On its side lying opposite the major and minor flanks 20', 20", the drill bit 34 is provided with a coupling part 96 which is couplable, so as to form the separation point 30, to a coupling receptacle 94 arranged on the end face of the basic body 32. For this purpose, the coupling part 96 has two convexly curved centering portions 40 which are arranged so as to be distributed over the circumference and which engage into concavely curved centering portions 42, complementary to these, of the clutch receptacle 94. Further, the coupling part 96 has a complementary driver stop 46 meshing with a rotary driver 44 of the coupling receptacle 94.

A particular feature of the invention is that the centering portions 40, 42 of the coupling part 96 and of the coupling receptacle 94 have up to the abutment of the driver stop 46, opposite to a working direction of rotation, determined by the cutting direction of the major cutting edges 16, about the axis of rotation 24, tension faces 48, 50 which run toward one another in the manner of a rotary wedge. The tension faces 48, 50 of the coupling part 96 and/or of the coupling receptacle 94 have, for this purpose, circle segments which lie diametrically opposite one another and are eccentric with respect to one another (cf. FIG. 6b and FIGS. 7a to d), which have a radius decreasing opposite to the predetermined working direction of rotation with respect to the axis of rotation 24. If, in addition, at least one of the tension faces which face one another is elastically deformable or bendable so as to form a non-positive connection, said bracing in the manner of a rotary wedge occurs. Moreover, the tension faces 48, 50 form conical faces 42, 44 (cf. FIG. 6a and FIG. 4) which face one another and complete one another to form a cone with a cone axis concentric with respect to the predetermined axis of rotation and the cone angles of which diverge in the tension direction and, in the exemplary embodiment shown, amount to 2° on the side of the drill bit 34 and to 2.2° on the side of the basic body 32. Furthermore, the drill bit 34 and the basic body 32 have planar face portions 52, 54 which face one another and are oriented essentially perpendicularly with respect to the axis of rotation 24 in which, in the coupling position, are pressed one against the other in pairs under the action of the conical tension faces 48, 50.

As can be seen from FIGS. 7a to d, the drill bit and the basic body are connected to one another in the manner of a bayonet fastening by means of their coupling part 96 and coupling receptacle 94. For precentering, the drill bit 34 has a cylindrical centering tenon 56 which projects at the free end of its coupling part 96 and which engages into a complementary centering orifice 58 on the bottom of the coupling receptacle 94. During further rotation from the angular position W1 through W2, W3 into the angular position W4, the coupling part 96 first engages with the radius part R1 of the centering portions 42 into the complementary centering portions 40 of the coupling receptacle 94 and gradually slides with the conical tension faces 50 on the tension faces 48 of the centering portions 40 until, in the position of FIG. 7d, the angle W4=0 is reached and the driver stop 46 of the drill bit 34 butts against the rotary driver 44 of the coupling receptacle. During this rotation, the eccentric movements which can be seen in FIGS. 6b and 8 take effect and lead to a bracing of the coupling part 96 and of the coupling receptacle 44 at their tension faces 48, 50.

To explain the eccentric movements occurring during mounting between the coupling part 96 and the coupling receptacle 44, the diagram of FIG. 8 indicates the part-circular outlines of the tension faces 48, 50 with the associated center points and radii. It is clear from this that the concavely curved centering portions 42 of the coupling receptacle 94 form in cross section part circles concentric with respect to the axis of rotation and having a predetermined radius R1, and that the convex centering portions 40 of the coupling part 96 in each case have a guide portion 40' concentric with respect to the axis of rotation 24, with a radius R1' corresponding to the receptacle-side radius R1, and a part-circular tension portion 40" adjoining said guide portion tangentially and eccentric with respect to the axis of rotation 24 with a predetermined eccentricity e, with a larger radius R2', R2"=R1+e, the eccentric tension portions 40" of the coupling part 96 and the part-circular centering portions 42 of the coupling receptacle 94 bearing non-positively one against the other in their tension position. The radii R1 are in this case related to the center point lying in the axis of rotation and the radii R2' and R2" are related respectively to the center points M2' and M2" eccentric thereto. During the coupling operation, the coupling part 96 and the coupling receptacle 94 are rotated with respect to one another in the manner of a bayonet fastening at the separation point. At the same time, on account of the conicity of the centering portions 42, 40, an eccentricity of the centering portions 42, 40 occurs, thus resulting in planar face bracing at the planar face portions 54, 52 (FIG. 1c).

As can be seen particularly from FIGS. 2a and b in conjunction with FIG. 4, a positive connection also occurs in the region of the rotary driver 44 and of the driver stop 46 on account of the abutment slope 60. In the exemplary embodiment shown, the angle of incidence of the abutment slope 60 amounts to about 11°. It can be seen, furthermore, from FIGS. 2a and b that the abutment slope 60 of the drill bit forms a planar or crowned face part 60' delimited by two marginal parts 60", 60''' which lie opposite one another and of which one (60") is curved concavely and the other (60''') is curved convexly. The marginal parts merge, forming an acute angle, directly or indirectly via a relief 62 in each case into a planar face portion 52, 53 perpendicular with respect to the axis of rotation 24 of the drill bit 34. For tolerance reasons, either the planar face portion 52 or the planar face portion 53 serves, together with the complementary planar face portion 54 of the basic body, for planar face bracing. The acute angles (79°) of the marginal parts 60", 60''' are essentially identical and correspond to a right angle (90°) reduced by the angle of incidence (11°) of the abutment slope 60. What is achieved by these measures is that no notch effect, which could lead to a material fracture during the tensioning operation, occurs on the drill bit 34 at the abutment points.

In order to make it easier to fix the drill bit 34 on the basic body 32 and to remove it from the latter, there are arranged in the region of the minor flanks 20" of the drill bit two key engagement points 64 which are at an angular distance of about 180° from one another in the circumferential direction and are marginally open both in the axial and in the radial direction. The key engagement points 64 have key abutment faces 68 which are oriented essentially parallel to the axis of rotation 24 and are delimited by an engagement bottom 66 and which are of about the same height in the closing and the opening direction (cf. FIG. 3a). The engagement bottoms 66 of the key engagement points 64 are therefore oriented obliquely with respect to a circumferential plane perpendicular to the axis of rotation (cf. FIGS. 2a, b, FIG. 3a). Correspondingly, the engagement bottoms are oriented, at least in the circumferential direction, approximately parallel to the associated minor flank 20" (cf. FIG. 3a).

In summary, the following may be stated: the invention relates to a drilling tool with a basic body 32 having a central axis of rotation 24 and with a drill bit 34 connected releasably to the basic body 32. The drill bit 34 has a coupling part 96 which is couplable to an end-face coupling receptacle 92 of the basic body 32 and which has at least two convexly curved centering portions 40 which are arranged so as to be distributed over the circumference and which engage with an exact fit into concavely curved centering portions 42, complementary to said convexly curved centering portions, of the coupling receptacle 94. The coupling part 96 has a complementary driver stop 46 meshing with a rotary driver 44 of the coupling receptacle 94. What is claimed as novel is that the centering portions 40, 42 of the coupling part 96 and/or of the coupling receptacle 94 have up to the mutual abutment of the driver stop 46 and of the rotary driver 44, opposite to a predetermined direction of rotation, tension faces 48, 50 which run toward one another in the manner of a rotary wedge.

The invention claimed is:

1. A drilling tool with a basic body (32) having a central axis of rotation (24) and with a drill bit (34) connected releasably to the basic body (32), the drill bit (34) having a coupling part (96) which is couplable to an end-face coupling receptacle (94) of the basic body (32) and which has at least two convexly curved centering portions (40) which are arranged so as to be distributed over the circumference and which engage with an exact fit into concavely curved centering portions (42), complementary to said convexly curved centering portions, of the coupling receptacle (94), and the coupling part (96) having at least one complementary driver stop

(46) meshing with a rotary driver (44) of the coupling receptacle (94), and the centering portions (40, 42) of the coupling part (96) and/or of the coupling receptacle (94) having, up to the mutual abutment of the driver stop (46) and of the rotary driver (44), tension faces (48, 50) running toward one another in the manner of a rotary wedge opposite to a predetermined working direction of rotation, characterized in that the tension faces (48, 50) of the coupling part (96) form circle segments (40', 40") which lie diametrically opposite one another and are eccentric with respect to the axis of rotation (24) and with respect to one another, the concave centering portions (42) of the coupling receptacle (94) form in cross section part circles concentric with respect to the axis of rotation and having a predetermined radius (R1), and the convex centering portions (40) of the coupling part (96) have a part-circular guide portion (40') concentric with respect to the axis of rotation, with a radius (R1) corresponding to the receptacle-side radius (R1), and a part-circular tension portion (40") tangentially adjoining said guide portion and eccentric with respect to the axis of rotation, with a radius (R2', R2") larger than the receptacle-side radius (R1), the eccentric tension portions (40") of the coupling part (96) and the part-circular centering portions (42) of the coupling receptacle (94) bearing non-positively one against the other in their tension position.

2. The drilling tool as claimed in claim 1, characterized in that at least one of the centering portions (40, 42) facing one another is at least partially elastically deformable or bendable so as to form a non-positive connection.

3. The drilling tool as claimed in claim 1, characterized in that the coupling part (96) and the coupling receptacle (94) are rotatable with respect to one another in the manner of a bayonet fastening at their separation point (30).

4. The drilling tool as claimed in claim 1, characterized in that the tension faces (48, 50) form conical faces which face one another in pairs and form a cone with a cone axis concentric with respect to the axis of rotation (24).

5. The drilling tool as claimed in claim 4, characterized in that the coupling part (96) and the coupling receptacle (94) have planar face portions (52, 54) which face one another and, in a coupling position, are pressed one against the other under the action of the conical tension faces (48, 50) and are oriented essentially perpendicularly with respect to the axis of rotation.

6. The drilling tool as claimed in claim 5, characterized in that the conical tension faces (48, 50) form, in the tension position, a positive connection between the coupling receptacle (94) and the coupling part (96).

7. The drilling tool as claimed in claim 5, characterized in that the cone has an angle of 1° to 8°.

8. The drilling tool as claimed in claim 5, characterized in that a coupling-part-side cone angle is steeper than a coupling-receptacle-side cone angle.

9. The drilling tool as claimed in claim 1, characterized in that the driver stops (46) and the rotary drivers (44) have in pairs an abutment slope (60) which in the coupling state forms a positive connection between the basic body and the drill bit.

10. The drilling tool as claimed in claim 9, characterized in that the angle of incidence of the abutment slope is 8° to 15°.

11. The drilling tool as claimed in claim 9, characterized in that the abutment slope of the driver stop (46) of the drill bit (44) forms a planar or crowned face part (60') delimited by two marginal parts (60", 60'") which lie opposite one another and of which one is concavely curved and the other is convexly curved, and which, forming an acute angle, merge directly or indirectly via a relief (62), in each case into a planar face portion (52, 53) perpendicular with respect to the axis of rotation (24) of the drill bit (34).

12. The drilling tool as claimed in claim 11, characterized in that the acute angles of the marginal parts (60", 60'") are substantially identical and correspond to a right angle reduced by the angle of incidence of the abutment slope (60).

13. The drilling tool as claimed in claim 1, characterized in that the coupling part (96) and the coupling receptacle (94) have a preferably cylindrical, conical or crowned centering tenon (56) and a centering recess (58), complementary to this, as a precentering means.

14. The drilling tool as claimed in claim 1, characterized in that the drill bit (34) has two end-face cutting edges (16) arranged so as to be offset with respect to one another by about 180°.

15. The drilling tool as claimed in claim 1, characterized in that the drill bit (34) and the basic body (32) have at least two chip-conveying grooves (22) which merge one into the other over the separation point (30).

16. The drilling tool as claimed in claim 15, characterized in that the chip-conveying grooves (22) are at least partially coiled along the basic body (32).

17. The drilling tool as claimed in claim 1, characterized in that the drill bit (34) consists of a harder material than the basic body (32).

18. The drilling tool as claimed in claim 17, characterized in that the drill bit (34) is formed as a pressing or casting from hard metal or ceramic material.

19. The drilling tool as claimed in claim 1, characterized in that the basic body (32) is hardened at least in the region of its functional faces designed as bearing or tension faces for the drill bit (34).

20. The drilling tool as claimed in claim 1, characterized in that at least two marginally open key engagement points (64) which are at an angular distance from one another in the circumferential direction are arranged in the region of the flanks or minor flanks (20', 20") of the drill bit (34).

21. The drilling tool as claimed in claim 20, characterized in that the key engagement points (64) are at an angular distance from one another of about 180°.

22. The drilling tool as claimed in claim 20, characterized in that the key engagement points (64) have an axial marginal orifice.

23. The drilling tool as claimed in claim 20, characterized in that the key engagement points (64) have a radial marginal orifice.

24. The drilling tool as claimed in claim 20, characterized in that the key engagement points (64) have key abutment faces (68) which are oriented essentially parallel to the axis of rotation (24) and are delimited by an engagement bottom (66).

25. The drilling tool as claimed in claim 1, characterized in that the basic body (32) has at least two chip-conveying grooves (22) delimited on their flanks by ribs (26), and in that there is arranged in each of the ribs (26) of the basic body (32) a coolant duct which has, at the drill-bit-side end of the basic body, an outlet orifice (36) arranged within one of the chip-conveying grooves (22).

26. The drilling tool as claimed in claim 25, characterized in that at least one of the chip-conveying grooves (22) and at least one of the coolant ducts (28) are curved helically.

* * * * *